(12) United States Patent
Tojo et al.

(10) Patent No.: US 6,192,190 B1
(45) Date of Patent: *Feb. 20, 2001

(54) DIGITAL IMAGE RECORDING AND/OR REPRODUCING APPARATUS USING A PLURALITY OF COMPRESSION METHODS

(75) Inventors: Akihiko Tojo; Toshihiko Mimura, both of Yokohama; Yoshitaka Murata; Nobuaki Date, both of Kawasaki; Kan Takaiwa, Hachioji; Hideaki Kawamura, Kawasaki; Hiroyuki Horii; Takashi Suzuki, both of Yokohama; Seiichi Ozaki, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/453,489

(22) Filed: May 30, 1995

Related U.S. Application Data

(63) Continuation of application No. 08/155,163, filed on Nov. 19, 1993, now abandoned, which is a continuation of application No. 07/863,545, filed on Apr. 6, 1992, now abandoned, which is a continuation of application No. 07/343,666, filed on Apr. 27, 1989, now abandoned.

(30) Foreign Application Priority Data

Apr. 28, 1988 (JP) .................................................. 63-108805

(51) Int. Cl.[7] ...................................................... H04N 5/92
(52) U.S. Cl. ............................ 386/109; 386/112; 386/117
(58) Field of Search .................................... 358/310, 335, 358/906, 909.1; 360/8, 32; 348/207, 400, 409, 420; 386/33, 38, 109–112, 117, 121; H04N 5/76, 5/781, 5/782, 5/783, 5/78, 9/79, 5/225, 5/92, 7/12

(56) References Cited

U.S. PATENT DOCUMENTS

| | | | | |
|---|---|---|---|---|
| 4,456,931 | * | 6/1984 | Toyoda et al. | 358/906 |
| 4,592,041 | * | 5/1986 | Senzaki et al. | 369/126 |
| 4,691,253 | * | 9/1987 | Silver | 358/906 |
| 4,717,950 | * | 1/1988 | Wesolowski | 358/323 |
| 4,837,628 | * | 6/1989 | Sasaki | 358/906 |
| 4,932,066 | * | 6/1990 | Nakayama et al. | 358/135 |
| 5,012,352 | | 4/1991 | Tojo . | |
| 5,034,804 | * | 7/1991 | Sasaki et al. | 358/335 |
| 5,067,029 | * | 11/1991 | Takahashi | 358/335 |
| 5,068,744 | * | 11/1991 | Ito | 358/335 |
| 5,128,963 | * | 7/1992 | Akagiri | 358/135 |

FOREIGN PATENT DOCUMENTS

2140242 * 11/1984 (GB) .................................. 358/310

* cited by examiner

Primary Examiner—Thai Tran
(74) Attorney, Agent, or Firm—Fitzpatrick, Cella, Harper & Scinto

(57) ABSTRACT

A digital image recording and/or reproducing apparatus using a plurality of compression methods may include, in a recording section, (a) data compression circuitry, including a plurality of compression circuits which have different compression methods, for changing a compression rate for input digital image data by changing a combination of the plurality of compression circuits compressing the digital input image data and (b) circuitry for recording (1) the digital image data compressed by the data compressing circuit and (2) data representing the compression rate of the digital image data compressed by the data compressing circuit. The apparatus may include a reproducing section having (a) a reproducing circuit for reproducing from the recording medium the digital image data compressed with the compression rate provided by the combination of different compression methods, (b) detecting circuitry for detecting the data representing the predetermined compression rate stored on the recording medium, and (c) reconstruction circuitry for reconstructing the digital image data reproduced by the reproducing circuitry according to the representing data detected by the detecting circuitry.

56 Claims, 6 Drawing Sheets

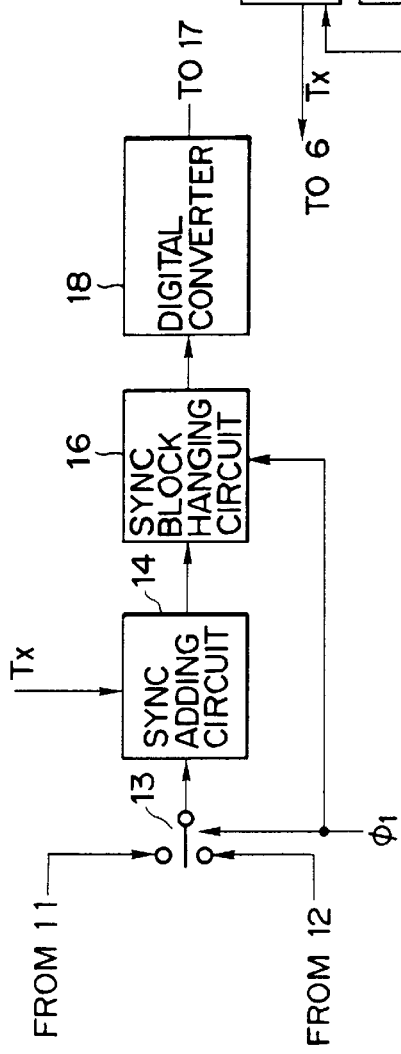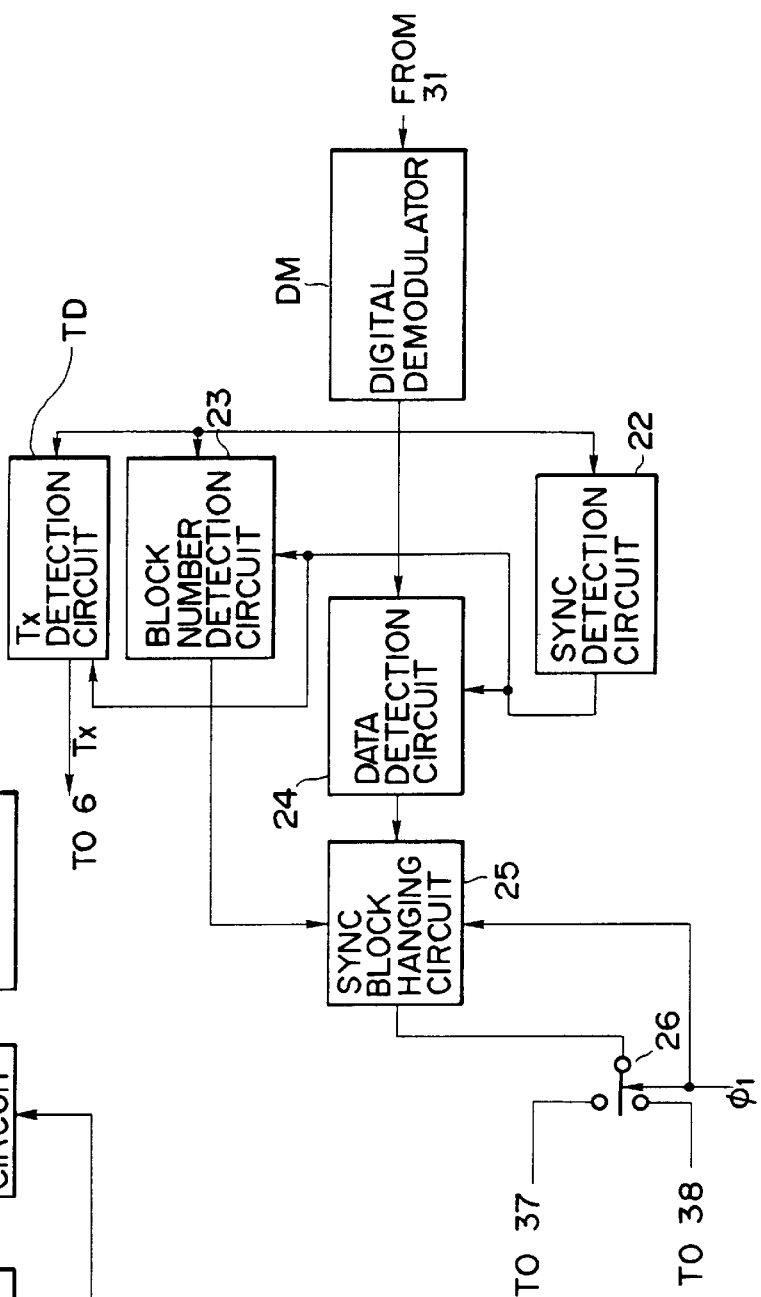

FIG.7

RECORDING DIRECTION →

| A - 1 | V - 1 - 2 | V - 1 - 3 |
|---|---|---|
| V - 1 - 1 | V - 2 - 2 | V - 2 - 3 |
| ⋮ | ⋮ | ⋮ |
| V - 12 - 1 | A - 2 | V - 13 - 3 |
| V - 13 - 1 | V - 13 - 2 | V - 14 - 3 |
| ⋮ | ⋮ | ⋮ |
| V - 23 - 1 | V - 23 - 2 | A - 3 |
| V - 24 - 1 | V - 24 - 2 | V - 24 - 3 |
| ⋮ | ⋮ | ⋮ |
| V - 32 - 1 | V - 32 - 2 | V - 32 - 3 |

DIGITAL IMAGE RECORDING AND/OR REPRODUCING APPARATUS USING A PLURALITY OF COMPRESSION METHODS

This application is a continuation of application Ser. No. 08/155,163 filed Nov. 19, 1993 abandoned, which is a continuation of application Ser. No. 07/863,545 filed Apr. 6, 1992 abandoned, which was a continuation of application Ser. No. 07/343,666, filed Apr. 27, 1989, all three now abandoned.

BACKGROUND OF THE INVENTION

1. Field of the Invention

The present invention relates to digital image recording and/or reproducing apparatus, and more particularly to such apparatus which are capable of changing a time (or a compression rate) for (or at) which a digital signal is recorded on the same recording medium.

2. Related Background Art

In a conventional apparatus for recording a wideband video signal, a method of changing a track pitch to thereby change the time for which the video signal is recorded on the same recording medium is used as in a well-known video tape recorder (VTR). This method is intended to perform long-time recording by sacrificing the dynamic range of the S/N ratio of a signal to be recorded. In a VTR of this type, it is not difficult to set the track pitch at any value and it is relatively easy to set a desired recording time. Therefore, it is also easy technically to set various recording times.

With the advancement of the recent digital image signal processing techniques, a digital image recording apparatus (DVR) which digitizes a wideband analog signal such as a video signal, digitally modulates the resulting digital signal, records and reproduces the modulated signal has been also developed. In such a DVR, the S/N ratio of the reproduced signal does not depend on the quality of the reproduced data, but reproduction itself would become impossible if the S/N ratio of the reproduced signal decreases below a certain value. Therefore, in such a DVR, to change the track pitch and hence the recording time is senseless because images of the same quality are recorded and reproduced at any track pitch. Thus, it is desirable that in a DVR, a signal is recorded and reproduced with a track pitch determined such that digital data can be recovered sufficiently. It is not conceivable that the track pitch would be further increased or decreased to change the recording time in a DVR of this type.

It has been proposed to enable long-time recording by reducing a quantity of data to be recorded in a DVR of this type. Namely, it has been proposed to change the recording time by changing the number of tracks formed per unit time.

In order to change the quantity of data to be recorded, there are methods of changing the number of bits of each of pixels of a video signal, and methods of changing the sample frequency.

However, in such a DVR, a correct image cannot be obtained even if a quantity of data per unit time may be changed to various values unless reproduction corresponding to those changes in the quantity of data is made. Especially if images are recorded by changing the compression rates of the images picture by picture, it is very troublesome to perform such adjustment.

Conventionally, generally in a DVR, an area where a digital video signal is recorded (a video area) and an area where a digital audio signal is recorded (an audio area) are separately provided on a recording track and those signals are processed, recorded and reproduced by separate corresponding signal processing circuits.

However, in the conventional DVRs, audio data and video data must be processed by separate signal processing systems. In addition, since the audio area is small, all the audio data for one track may be nullified by a long time dropout.

SUMMARY OF THE INVENTION

It is therefore an object of the present invention to provide a digital image recording and/or reproducing apparatus which is capable of easily setting a desired compression rate in a predetermined range on the same recording medium.

In order to achieve such an object, a digital image recording apparatus as an embodiment of the present invention comprises means for variably compressing a quantity of digital image data, and means for adding data on the compression rate of the digital image data output by the compressing means to the digital image data and recording the resulting data.

According to the embodiment of the present invention, the digital image data is reproduced in accordance with the compressed and recorded digital image data and the data on the data compression rate added to the digital image data.

By such arrangement, optimal expansion corresponding to the compression rate by the data compression means is performed during reproduction and a high quality image is digitally reproduced.

BRIEF DESCRIPTION OF THE DRAWINGS

FIG. 6A is a schematic of a digital processor 15 of FIG. 1;

FIG. 6B is a schematic of a digital processor 33 of FIG. 1;

FIG. 7 illustrates the order in which sync blocks are recorded; and

DESCRIPTION OF THE PREFERRED EMBODIMENTS

Figure 1:
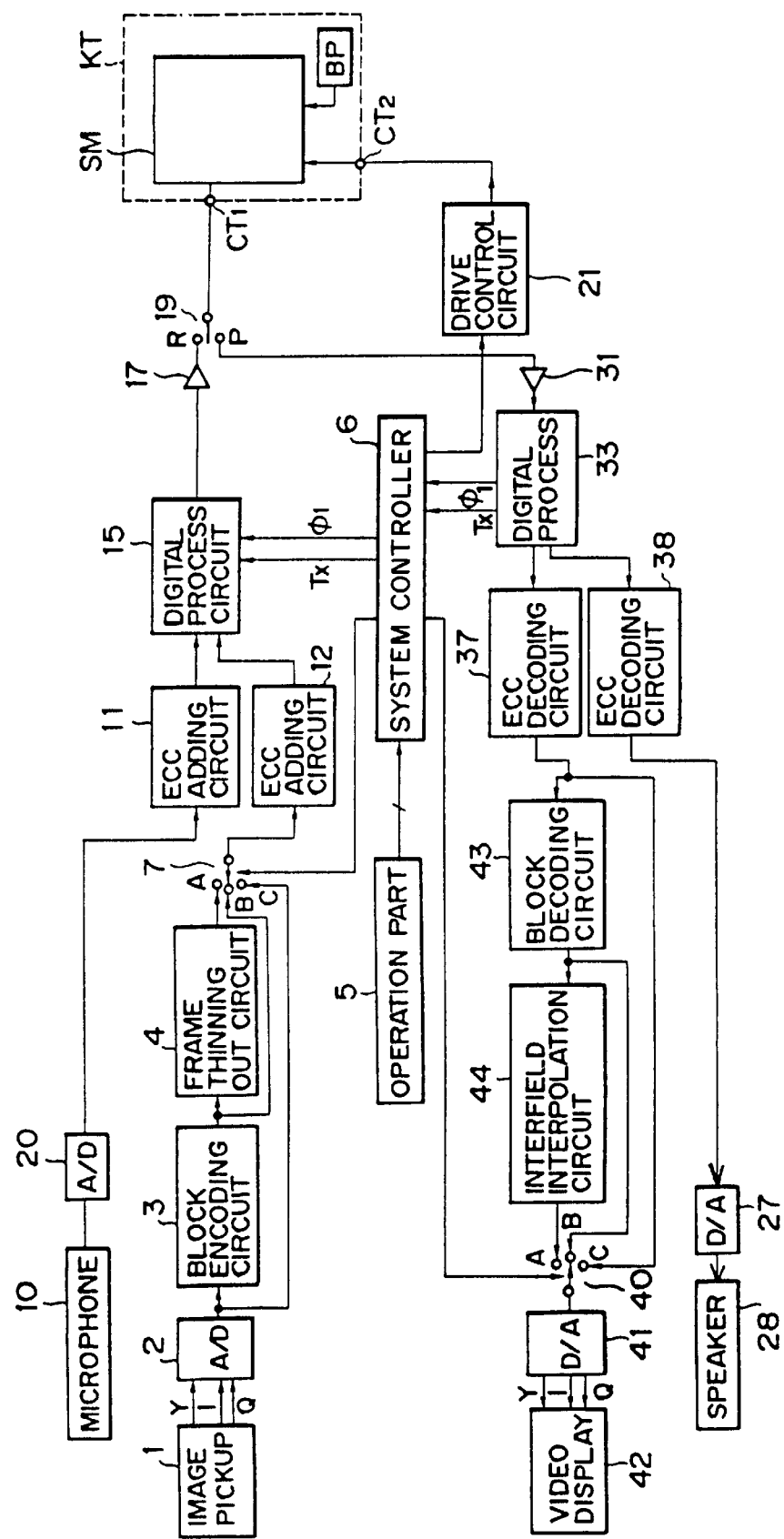
FIG. 1 is a schematic of a DVR as one embodiment of the present invention.

One embodiment of the present invention will now be described with reference to the drawings. FIG. 1 is a schematic of a DVR as one embodiment of the present invention. Image pickup means 1 such as a CCD or a MOS outputs an analog video signal in frames of two fields obtained by interlace scanning. The analog video signal comprises a luminance signal Y, and color difference signals I, Q input in parallel in conformity to an NTSC signal.

The video signal is sampled by a sample signal of a frequency equal to or more than twice the highest frequency of the video signal in an analog-to-digital (A/D) converter 2 and converted into a digital signal of about 8 bits.

More specifically, the luminance signal Y is sampled at a frequency of 4 $f_{sc}$ where $f_{sc}$ is a color sub-carrier frequency and I and Q are sampled at $f_{sc}$. The output data is thinned out in such a manner that sample points do not align vertically between adjacent lines during interlace scan. Thus, the A/D converter 2 performs a so-called sample operation. The number of samples for Y at this time is (3.58 M÷15.75 K)×4/2, namely, 455 per horizontal scan interval (1 H). Actually, only the effective image is converted to data so as to be 372 samples per 1 H. The number of samples for each of I and Q is about ¼ of the number of samples per 1 H for Y, namely, 96. A block encoding circuit 3 divides the digital data output by the A/D converter 2 into groups each including (4×4) pixels (block) adjacent to the axis of ordinates on the screen, and reduces the number of transmitted bits per pixel by using the correlation of images in each group. If, for example, the data output by the A/D converter 2 has 8 bits allocated to every 16 pixels, transmitted data for one block is 128 (=8×16 pixels). If data on a pixel having the maximum value among all the pixels in each block is transmitted with 8 bits, data on a pixel having the minimum value is transmitted with 8 bits, and 3-bit data obtained by linearly quantizing the difference between the maximum and minimum values into 8 stages is transmitted, data to be transmitted will be composed of 64 (=8×2+3×16) bits, so that a quantity of data to be transmitted is reduced to ½ without deteriorating the image quality significantly.

A frame thinning out circuit 4 outputs only the first field of one-frame image data of the output data from the block encoding circuit 3 and no second field data is output. Therefore, the output data from the frame thinning out circuit 4 is ¼ of the output data from the A/D converter 2.

As described above, the DVR of the particular embodiment has three kinds of recording modes. A mode in which all the data output from the A/D converter 2 is recorded is called a standard mode, a mode in which the data output from the block encoding circuit 3 is recorded is called a two-fold mode, and a mode in which the data output from the frame thinning out circuit 4 is recorded is called a four-fold. The respective recording modes are designated by the user's manual operation of an operation part 5 at recording. In accordance with this operation, a system controller 6 connects a switch 7 to one of A, B and C terminals.

An ECC (Error Correction Code) adding circuit 12 adds an ECC to the image data output from the switch 7.

Figure 2:
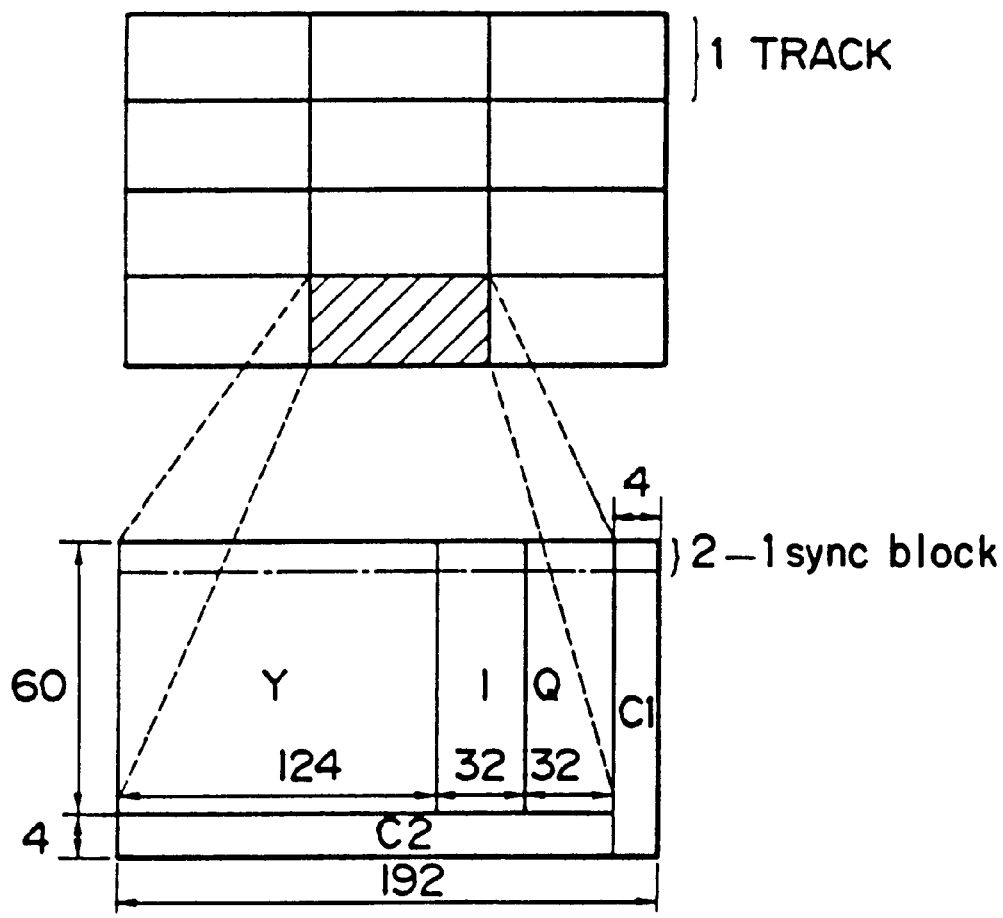
FIG. 2 illustrates video data to be recorded.

Assume here that a video data block unit to which the ECC is added is a quantity of data corresponding to an image in one of 4 (vertical)×3 (horizontal) areas to which one screen (field) is divided as shown by the hatched portion in FIG. 2. If the number of effective horizontal scan lines is 240, the quantity of data includes data on Ys at 60 (vertical)×124 (horizontal) (=372/3) sample points and data on I and Q each at 60 (vertical)×32 (horizontal) (=96/3) sample points. These data are disposed in a memory in the ECC adding circuit 12 as shown in an upper half of FIG. 2. ECC codes C1 and C2 are added as shown in FIG. 2 to provide (192×64) data blocks where numerals in a lower half of FIG. 2 represent the number of bytes, and data at each sample point consists of 8 bits (one byte).

Figure 3:
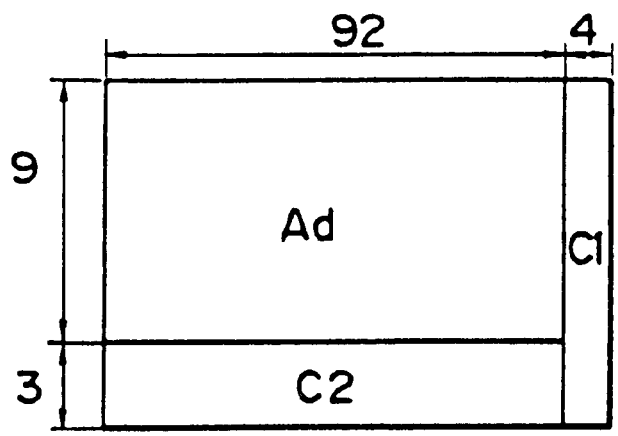
FIG. 3 illustrates audio data to be recorded.

For example, a 4-channel (CH) audio signal is input from a microphone 10 into the A/D converter 20 where the audio signal is sampled at a frequency of 48 KHz and the results are delivered to a memory in the ECC adding circuit 13. At this time, the number of samples per field of the video signal is 3,200 (=48 K/60×4). The 3200 samples are divided into four groups, one constituting an audio data block unit to which the ECC is added. In order to convert the audio data and video data to sync data and block data of the same size, 18 other data segments are added to each of the audio data and video data to thereby arrange the resulting (9×92) data segments in a memory as shown in FIG. 3 and add ECC codes C1 and C2 to those data segments in the ECC adding circuit 13 as shown in FIG. 3. In the DVR of the embodiment, a one-field image signal is recorded in parallel in four memory areas. Therefore, three video data block and one audio data blocks are recorded in one memory area (hereafter referred to as "1MR"). These data blocks are read in units of 384 bytes from the memories 3 and 7.

Figure 4:
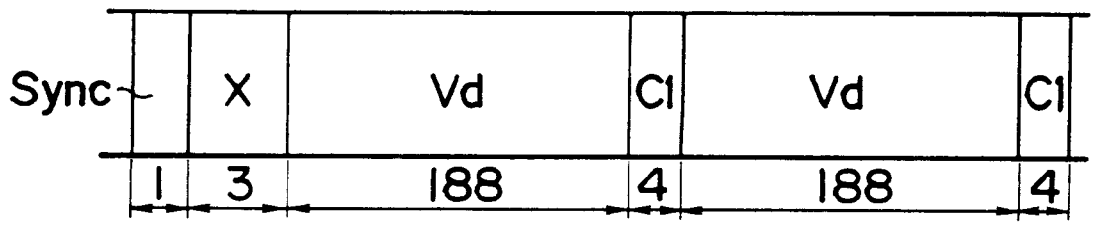
FIG. 4 illustrates the structure of a video sync block.
Figure 5:
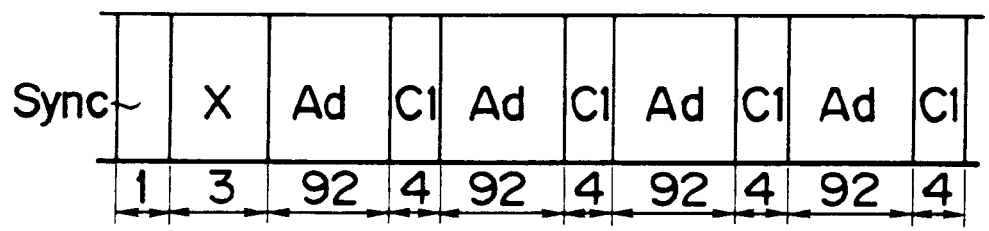
FIG. 5 illustrates the structure of an audio sync block.

As shown in FIG. 4, a video signal is read in nits of data for two lines adjacent to the vertical line of the block of FIG. 2. As shown in FIG. 5, an audio signals read in units of data for four vertical lines. These signals are input to a digital process circuit 15 of FIG. 6A.

A switch 13 receives from a system controller 6 a timing signal $ø_1$ having a period of an interval required for storing data in 1MR, and data of 384 bytes is read from the ECC adding circuit 11 (32×3) times and from the ECC adding circuit 12 three times in each period.

A sync adding circuit 14 adds to every 384 byte data, mentioned above, 3 byte data (X) comprising a code Tx which comprises sync data (sync) of one byte, a sync block number and a mode (standard, two-fold or four-fold) selected by the switch 7. Thus a sync block of 392 bytes results. The code Tx is received from the system controller 6 and is composed of a 2-bit signal corresponding to the state of the switch 7. FIG. 4 shows a video sync block comprising two lines (namely, 384 bytes) of video data Vd and code C1. FIG. 5 illustrates an audio sync block comprising audio data Ad and a code C1 for four lines in all (namely, 384 bytes). Thus, recorded data comprising 3 audio sync blocks and 96 video sync blocks per track is obtained.

A sync block changing circuit 16 disperses audio sync blocks in video sync blocks (in the particular embodiment, the changing circuit disperses three successively input audio sync blocks into 96 video sync blocks, which dispersion is shown in FIG. 7. A-1, A-2, A-3, V-1-1, V-1-2 . . . V-32-2, V-32-3, etc., each denote a sync block, and A-1, V-1-2, V-1-3, V-1-1 . . . V-12-1, A-2, V-13-3, V-13-1 . . . V-23-2, A-3, V-24-1 . . . V-32-2, and V-32-3 are read in this order from the ECC adding circuit 11. The specific structure of the changing circuit 16 will be described later.

The data output from the circuit 16 is subjected to modulation such as well-known mapping and encoding by a digital converter 18, and stored in the memory SM via an amplifier 17, a switch 19 and a removable direct connection contact CT1. The memory SM is accommodated within a cartridge KT removable from the DVR, and the cartridge KT is mounted in the DVR to be connected electrically via the direct connection contact CT1 to the DVR. A power source BP is provided within the cartridge KT to backup the memory SM.

Figure 8:
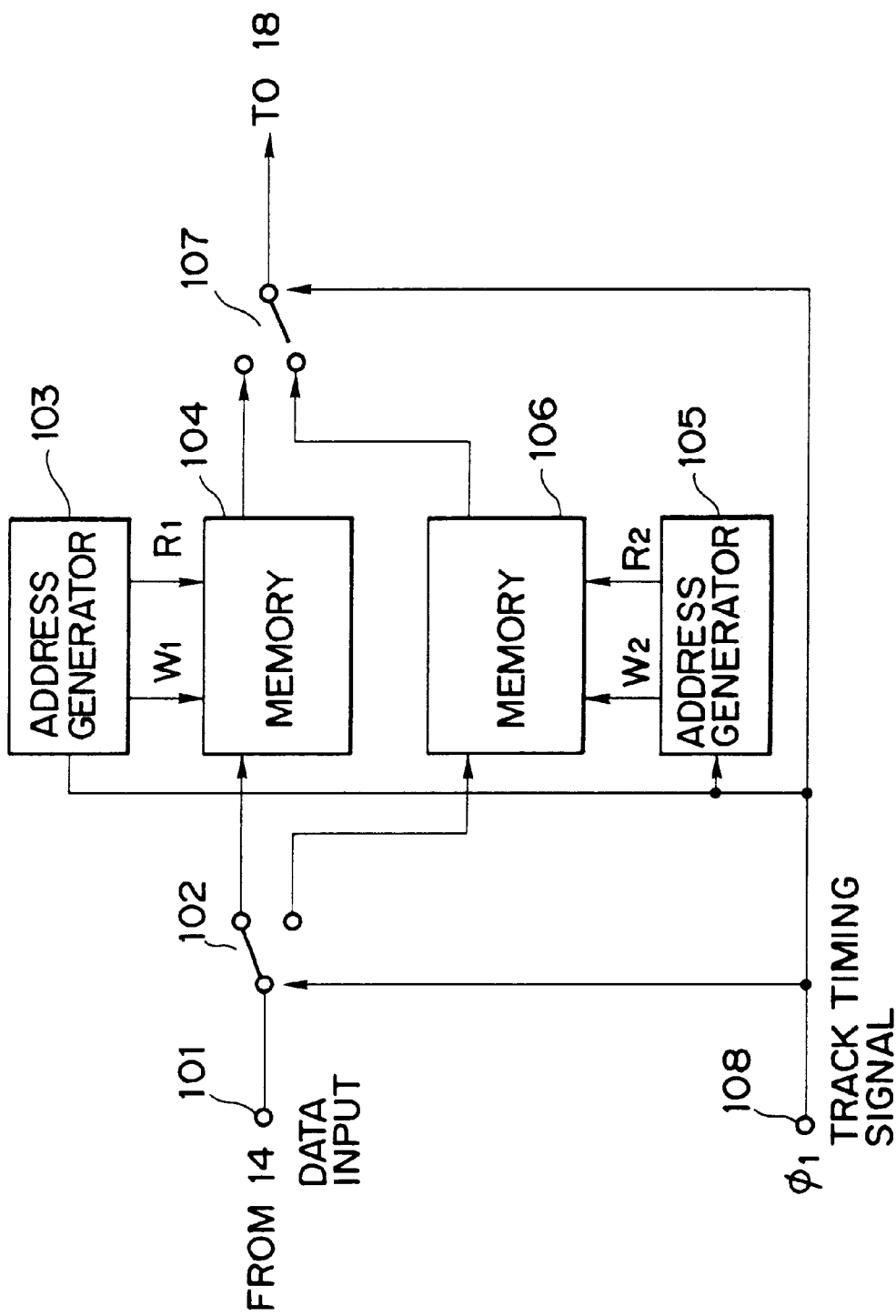
FIG. 8 illustrates one embodiment of a sync block changing circuit of FIG. 6A.

One embodiment of the sync block changing circuit 16 will now be described in FIG. 8. In FIG. 8, a terminal 101 receives data comprising successive audio sync blocks from the sync adding circuit 14 as mentioned above. The input signal is written into memories 104 and 106 for each MR via a switch 102.

The operation of the switch 102 is controlled by timing signal $ø_1$ shown in FIG. 6A receives at a timing signal input terminal 108 to switch between the memories 104 and 106 for each MR. Address of writting into the memories 104 and 106 are designated by $W_1$ and $W_2$ signals generated by address generators 103 and 105 controlled by a track timing signal to disperse and locate voice signal data in image signal data in memories 104 and 106.

When data is read from the memories, read addresses are designated by $R_1$ and $R_2$ signals from address generators 103 and 105 and data are read from memories 104 and 106 in the order shown in FIG. 7.

According to such structure, since the output from the block encoding circuit 3 can be recorded as compressed data comprising one half of the original data, it is unnecessary to provide separate ½ and ¼ compression circuit to provide three kinds of image data.

The structure of the reproduction system of the DVR of the particular embodiment will be described briefly. The reading of the memory SM is controlled by a drive control circuit 21 and thus the reproduced signal is obtained from a terminal P of the switch 19. This reproduced signal is delivered via an amplifier 31 to a digital process circuit 33 such as that shown in FIG. 6B.

The signal received by the digital processor 33 is demodulated by a demodulator DM, the resulting signal is input to a sync detection circuit 22, a data detection circuit 24, a block number detection circuit 23 and a Tx detection circuit TD, the sync of the signal is detected by a sync detection circuit 22, the respective data segments are recovered by the data detection circuit 24 in accordance with a clock generated by the detected sync, the sync block number of the data X is detected by the block number detection circuit 23, and the Tx code is detected by the Tx detection circuit.

A sync block changing circuit 25 performs processing reverse to that performed by the circuit 16 to output 3 audio sync blocks and 96 video sync blocks successively. In order to perform this processing, the timing signal $\phi_1$ from the system controller 6 is used and confirmed by the sync block number. The switch 26 feeds video data to an ECC decoding circuit 37 comprising a memory, and audio data to an ECC decoding circuit 38 comprising a memory. The data fed to the memories 37 and 38 is subjected to error correction by the respective ECC decoding operations. Then the audio data is returned to the original analog signal via the digital-to-analog converter 27 and output as a sound from a speaker terminal 28.

Since the switch 40 is switched by the system controller 6 in accordance with the Tx code detected by the Tx detection circuit TD, the video data delivered via the ECC decoding circuit 37 is delivered intactly via a C terminal of the switch 40 to a digital-to-analog converter 41 to thereby be recovered as an analog video signal is video data in which the signal recorded in the standard mode. For a signal recorded in the two-fold mode, the data converted to the block code is recovered by the block decoding circuit 43, and the resulting signal is delivered via a B terminal of the switch 40 to a D/A converter 41. For the signal recorded in the four-fold mode, the data output from the block decoding circuit 43 is delivered to an interfield interpolation circuit 44 where the field data is thinned out, and data is recovered and delivered via an A terminal of the switch 40 to the D/A converter 41, the output from which is delivered to an image display 42 for displaying purposes. It is to be noted that the switch is switched in accordance with data indicative of the recording mode recorded in the area shown by X in FIG. 4 and contained in the recording signals, as mentioned above.

In the DVR, a plurality of data quantity compression means is provided in series in setting three kinds of recording times on the same recording medium in order to enable data output from the intermediate taps of these means to be recorded, so that it is unnecessary to process data for another system comprising a data compression circuit for each recording mode only. One of the plurality of compression means uses a block encoding system to reduce the number of data segments per pixel and another uses a thinning-out system to reduce the number of pixels to be recorded, so that data can be easily extracted from the intermediate taps and even data compression in a plurality of stages will not greatly deteriorate the image.

While in the particular embodiment the use of the block encoding process has been described for reduction of the number of data segments for each pixel, of course, other processes such as difference decoding or prediction difference decoding may be used. While in the particular embodiment the mere thinning out of data segments is used to reduce the number of pixels, sampling using n fields as one period or variable density sampling may be used. While in the particular embodiment three stage modes, namely, the standard, two-fold and four-fold modes, have been described as being used, the number of mode stages may be increased or decreased or a quantity of data may be changed continuously.

In such DVR, two of three sync blocks of audio data can be recovered with high probability. If appropriate data replacement between audio data and ECC has been performed by the ECC adding circuit 12, errors can be corrected with high probability. Even if error correction is not complete, it is ensured that two of three data segments are recovered completely, so that interpolation is easy. Thus even if a long time dropout occurs, the deterioration of the audio signal during reproduction is minimized.

As just described above, in a digital image recording apparatus according to the present invention, when a digital image signal and a digital audio signal are recorded in the same memory, audio sync blocks comprising a predetermined number of audio data segments and a predetermined number of sync data segments are dispersed and recorded in a video sync block including a predetermined number of video data segments and a predetermined number of sync data segments, and the compressed image data during recording is added to the video sync block. Therefore, even if the reproduced signal is missing for a considerably long time, a plurality of audio sync blocks does not disappear simultaneously, and the audio data can be recovered by interpolation or correction of errors.

While in the particular embodiment the memories have been illustrated as including a semiconductor memory for easy handling, for example, a bubble memory, an optical memory, a magnetic memory or a bio-memory may be used, of course.

As described above, according to the present invention, a device of a relatively simple structure can be used to store a digital image signal of three or more kinds of quantities of data in the same memory and to reproduce these data segments in an optimal manner.

What is claimed is:

1. A digital image recording apparatus comprising:
   (a) data compressing means, including at least block-encoding means for compressing input digital image data according to a correlation between signals within each block divided from said input digital image data on a unit basis of a block, for providing digital image data compressed with different compression rates according to different operating conditions of said block-encoding means;
   (b) control means for manually selecting digital image data from the compressed digital image data of the different compression rates provided by said data compression means, on a unit basis of one frame of a picture image; and (c) means for recording (1) the digital image data selected by said control means and (2) data associated with the compression rate of said digital image data selected by said control means.

2. A digital image recording apparatus according to claim 1, wherein the recording means comprises a semiconductor memory.

3. A digital image recording apparatus according to claim 1, wherein the recording means comprises a medium attached removably to the digital image recording apparatus.

4. A digital image recording apparatus according to claim 1, further comprising:
   image pickup means for providing digital image data to the data compressing means.

5. A digital image recording apparatus according to claim 1, wherein the data compressing means comprises a block encoding circuit.

6. A digital image recording apparatus according to claim 1, wherein the data compressing means comprises data thinning-out means.

7. A digital image recording apparatus according to claim 1, wherein said data compressing means comprises data thinning-out means for providing digital image data compressed with different compression rates.

8. A digital image recordiing apparatus according to claim 1, wherein said data compressing means provides digital image data compressed with different compression rates according to whether said block encoding means is used or not.

9. A digital image recording apparatus according to claim 1, wherein said different compression rates include a rate where data compression is not carried out.

10. A digital image recording and reproducing apparatus comprising:
    (a) data compressing means, including at least block-encoding means for compressing input digital image data according to a correlation between signals within each block divided from said input digital image data on a unit basis of a block, for providing digital image data compressed with different compression rates according to different operating conditions of said block-encoding means;
    (b) control means for manually selecting digital image data from the compressed digital image data of the different compression rates provided by said data compression means, on a unit basis of one frame of a picture image;
    (c) means for recording on a recording medium (1) the digital image data selected by said control means and (2) data associated with the compression rate of said digital image data selected by said control means; and
    (d) means for reproducing the image data in accordance with (1) the recorded digital image data compressed with a predetermined compression rate, and (2) the recorded data representing the compression rate.

11. A digital image recording and reproducing apparatus according to claim 10, wherein the recording medium is mounted removably on a digital image reproducing apparatus.

12. A digital image recording and reproducing apparatus according to claim 10, wherein the recording medium comprises a semiconductor memory.

13. A digital image recording and reproducing apparatus according to claim 10, further comprising:
    (d) means for variably compressing a quantity of input digital image data; and
    (e) means for adding the data representing the compression rate to the digital image data output by the data compressing means.

14. A digital image recording and reproducing apparatus according to claim 13, further comprising:
    image pickup means for providing digital image data to the data compressing means.

15. A digital image recording and reproducing apparatus according to claim 13, wherein the data compressing means comprises a block encoding circuit.

16. A digital image recording and reproducing apparatus according to claim 13, wherein the data compressing means comprises data thinning-out means.

17. A digital image recording and reproducing apparatus according to claim 10, wherein the reproducing means comprises a block decoding circuit.

18. A digital image recording and reproducing apparatus according to claim 10, wherein the reproducing means comprises an interfield interpolation circuit.

19. An apparatus according to claim 10, wherein said data compressing means comprises data thinning-out means for providing digital image data compressed with different compression rates.

20. An apparatus according to claim 10, wherein said data compressing means provides digital image data compressed with different compression rates according to whether said block-encoding means is used or not.

21. An apparatus according to claim 10, wherein said different compression rates include a rate where data compression is not carried out.

22. A digital image reproducing apparatus comprising:
    (a) reproducing means, including block-decoding means for reproducing digital image data which is compressed with a different compression rate according to a correlation between signals within each block divided from input digital image data on a unit basis of a block by a block encoding means, for reproducing digital image data recorded on a recording medium, the digital image data being manually selected from compressed digital image data of different compression rates provided in different operating conditions of said block-encoding means, on a unit basis of one frame of a picture image and recorded on said recording medium;
    (b) detecting means for detecting information associated with the selected compression rate of the recorded digital data, said information representing the operation condition of said block-encoding means applied to said recorded digital data; and
    (c) reconstructing means for reconstructing the digital image data reproduced by said reproducing means, according to the information detected by said detecting means.

23. An apparatus according to claim 22, wrein said data compressing means comprises data thinning-out means for providing digital image data compressed with different compression rates.

24. An apparatus according to claim 22, wherein said data compressing means provides digital image data compressed with different compression rates according to whether said block-encoding means is used or not.

25. An apparatus according to claim 22, wherein different compression rates include a rate where data compression is not carried out.

26. A digital image transmitting apparatus comprising:
    (a) data compressing means, including at least block-encoding means for compressing input digital image data according to a correlation between signals within each block divided from said input digital image data on a unit basis of a block, for providing digital image data compressed with different compression rates according to different operating conditions of said block-encoding means;

(b) control means for manually selecting digital image data from the compressed digital image data of the different compression rates provided by said data compression means, on a unit basis of one frame of a picture image; and (c) means for transmitting (i) the digital image data selected by said control means and (ii) data associated with the compression rate of said digital image data selected by said control means.

27. A digital image transmitting apparatus according to claim 26, wherein said transmitting means comprises a recording medium for recording said data.

28. A digital image transmitting apparatus according to claim 27, wherein the recording medium is removably mounted on a digital image reproducing apparatus.

29. A digital image transmitting apparatus according to claim 27, wherein the recording medium comprises a semiconductor memory.

30. A digital image transmitting apparatus according to claim 27, further comprising:
   means for variably compressing a quantity of input digital image; and
   means for adding the data representing the compression rate to the digital image data output by the data compressing means.

31. A digital image transmitting apparatus according to claim 26, further comprising image pickup means for providing digital image data to the data compressing means.

32. A digital image transmitting apparatus according to claim 26, wherein the data compressing means comprises data thinning-out means.

33. An apparatus according to claim 26, wherein said data compressing means comprises data thinning-out means for providing digital imaage data compressed with different compression rates.

34. An apparatus according to claim 26, wherein said data compressing means provides digital image data compressed with different compression rates according to whether said block-encoding means is used or not.

35. An apparatus according to claim 26, wherein said different compression rates include a rate where data compression is not carried out.

36. A digital image recording apparatus comprising:
   (a) image pickup means for converting an optical image into an electrical signal;
   (b) analog to digital converting means for converting said electrical signal into a digital image signal;
   (c) block-coding means for compressing, with different compression rates, said digital image signal based on a correlation between signals within each block;
   (d) selection means for selecting a compressed digital image signal of a different compression rate corresponding to different operating conditions of said block-coding means;
   (e) storing means for storing information on whether said block coding means is operated; and
   (f) control means for manually controlling said selection means to provide the compressed digital image signals of the different compression rates, on a unit basis of one frame of a picture image.

37. Apparatus according to claim 36, further comprising thinning means for thinning said digital image signal.

38. Apparatus according to claim 37, wherein said thinning means selectively thins out said digital image signal.

39. Apparatus according to claim 36, further comprising error correction code adding means for adding an error correction code to said digital image signal block-coded by said block-coding means.

40. Apparatus according to claim 36, further comprising error correction code adding means for adding an error correction code to said digital image signal not block-coded by said block coding means.

41. A digital image recording apparatus according to claim 36, wherein said data compressing means comprises data thinning-out means for providing digital image data compressed with different compression rates.

42. A digital image recording apparatus according to claim 36, wherein said data compressing means provides digital image data compressed with different compression rates according to whether said block encoding means is used or not.

43. A digital image recording apparatus according to claim 36, wherein said different compression rates include a rate where data compression is not carried out.

44. A digital image reproducing apparatus for use with a recording device having a block-coding means for compressing, with a different compression rate, a digital image signal based on a correlation between signals within each block and a recording medium, a digital image signal to be recorded on the recording medium being manually selected from the compressed digital image signals of different compression rates provided by said block-encoding means on a unit basis of one frame of a picture image, said apparatus comprising:
   (a) reproducing means for reproducing information on whether the block-coding means was operated when the manually-selected digital image signal was recorded on the recording medium, and for reproducing a digital image signal recorded on the recording medium; and
   (b) block-decoding means for block-decoding the digital image signal reproduced from the recording medium by said reproducing means when the image signal was reproduced.

45. Apparatus according to claim 44, further comprising interpolating means for interpolating said digital image signal.

46. Apparatus according to claim 45, wherein said interpolating means selectively interpolates said digital image signal.

47. A digital image reproducing apparatus according to claim 44, further comprising error correction code decoding means for decoding said digital image signal.

48. An apparatus according to claim 44, wherein said different compression rates include a rate where data compression is not carried out.

49. A digital image recording method comprising the steps of:
   (a) a data compressing step, including at least a block-encoding step of compressing input digital image data according to a correlation between signals within each block divided from said input digital image data on a unit basis of a block, of providing digital image data compressed with different compression rates according to different operating conditions in said block-encoding steps;
   (b) a control step of manually selecting digital image data from the compressed digital image data of the different compression rates provided in said data compression step, on a unit basis of one frame of a picture image; and (c) a step of recording (i) the digital image data selected in said control step and (ii) data associated with the compression rate of said digital image data selected in said control step.

50. A digital image recording method according to claim 49, wherein said data compressing step comprises a data thinning-out step of providing digital image data compressed with different compression rates.

51. A digital image recording method according to claim 49, wherein said data compressing step provides digital image data compressed with different compression rates according to whether said block encoding step is used or not.

52. A digital image recording method according to claim 49, wherein said different compression rates include a rate where data compression is not carried out.

53. A digital image reproducing method for use with a recording device having a clock-encoding means for compressing, with different compression rates, a digital image signal based on a correlation between signals within each block and a recorded medium, a digital image signal to be recorded on said recording medium being manually selected from the compressed digital image signals of different compression rates provided by said block-encoding means on a unit basis of one frame of a picture image, said method comprising the steps of:

(a) a reproducing step of reproducing information on whether the block-encoding means was operated when the manually-selected digital image signal was recorded on the recording medium, and of reproducing a digital image signal recorded on the recording medium; and (b) a block-decoding step of block-decoding the digital image signal reproduced from the recording medium in said reproducing step when the iamge signal was reproduced.

54. A method according to claim 53, further comprising in interpolating step of interpolating said digital image signal.

55. A method according to claim 54, wherein said interpolating step includes a step of selectively interpolating said digital image signal.

56. A method according to claim 53, further comprising an error correction code decoding step of decoding said digital image signal.

* * * * *

UNITED STATES PATENT AND TRADEMARK OFFICE
CERTIFICATE OF CORRECTION

PATENT NO. : 6,192,190 B1
DATED : February 20, 2001
INVENTOR(S) : Akihiko Tojo et al.

It is certified that error appears in the above-identified patent and that said Letters Patent is hereby corrected as shown below:

Column 4,
Line 6, "block" should read -- blocks --;
Line 7, "blocks" should read -- block --;
Line 10, "nits" should read -- units --; and
Line 38, "denote" should read -- denotes --.

Column 5,
Line 44, "intacfly" should read -- intact --;
Line 46, "is" should read -- in which the --; and "in which" should read -- is --.

Column 7,
Line 25, "recordiing" should read -- recording --.

Column 8,
Line 34, "rate" should read -- rate by data compressing means which comprises block encoding means for compressing data --;
Line 36, "block by a" should read -- block, --;
Line 37, "block by encoding means," should be deleted; and
Line 40, "provided in" should read -- according to --.

Column 9,
Line 40, "imaage" should read -- image --.

Column 12,
Line 13, "iamge" should read -- image --; and
Line 15, "in" should read -- an --.

Signed and Sealed this

Twenty-ninth Day of January, 2002

*Attest:*

*Attesting Officer*

JAMES E. ROGAN
*Director of the United States Patent and Trademark Office*